(12) United States Patent
Okamura et al.

(10) Patent No.: US 8,124,553 B2
(45) Date of Patent: Feb. 28, 2012

(54) COMPOSITE SINTERED BODY

(75) Inventors: Katsumi Okamura, Itami (JP); Satoru Kukino, Itami (JP); Minori Teramoto, Itami (JP); Tomohiro Fukaya, Itami (JP); Katsuko Yamamoto, Itami (JP)

(73) Assignees: Sumitomo Electric Hardmetal Corp., Hyogo (JP); Sumitomo Electric Industries, Ltd., Osaka (JP)

( * ) Notice: Subject to any disclaimer, the term of this patent is extended or adjusted under 35 U.S.C. 154(b) by 143 days.

(21) Appl. No.: 12/523,114

(22) PCT Filed: Jan. 23, 2008

(86) PCT No.: PCT/JP2008/050884
§ 371 (c)(1),
(2), (4) Date: Jul. 14, 2009

(87) PCT Pub. No.: WO2008/093577
PCT Pub. Date: Aug. 7, 2008

(65) Prior Publication Data
US 2010/0099548 A1      Apr. 22, 2010

(30) Foreign Application Priority Data

Jan. 30, 2007   (JP) ................................ 2007-020186

(51) Int. Cl.
*C04B 35/5831* (2006.01)
(52) U.S. Cl. ........ 501/96.4; 501/87; 501/96.3; 501/98.6
(58) Field of Classification Search .................. 501/87, 501/96.4, 92, 96.3, 98.6
See application file for complete search history.

(56) References Cited

U.S. PATENT DOCUMENTS

| | | | |
|---|---|---|---|
| 5,200,372 A * | 4/1993 | Kuroyama et al. | 501/96.4 |
| 5,569,862 A * | 10/1996 | Kuroyama et al. | 75/238 |
| 5,639,285 A | 6/1997 | Yao et al. | |
| 5,853,873 A | 12/1998 | Kukino et al. | |
| 6,265,337 B1 | 7/2001 | Kukino et al. | |
| 6,830,724 B2 * | 12/2004 | Kobashi et al. | 419/5 |
| 7,081,424 B2 * | 7/2006 | Okamura et al. | 501/96.4 |
| 2005/0143252 A1 * | 6/2005 | Okamura et al. | 501/96.4 |
| 2005/0187093 A1 * | 8/2005 | McHale et al. | 501/96.4 |

FOREIGN PATENT DOCUMENTS

| | | | |
|---|---|---|---|
| JP | 53-077811 | | 7/1978 |
| JP | 60-014826 B2 | | 4/1985 |
| JP | 61-54857 | | 11/1986 |
| JP | 61-54858 | | 11/1986 |
| JP | 04026554 | * | 1/1992 |
| JP | 05-287433 | | 11/1993 |
| JP | 07-252580 | | 10/1995 |
| JP | 07-252581 | | 10/1995 |
| JP | 07252580 | * | 10/1995 |
| JP | 8-119774 | | 5/1996 |
| JP | 10-182242 | | 7/1998 |
| JP | 2000-226263 | | 8/2000 |

* cited by examiner

*Primary Examiner* — Karl Group
(74) *Attorney, Agent, or Firm* — McDermott Will & Emery LLP

(57) ABSTRACT

The composite sintered body of the invention is a composite sintered body, containing 20 volume % or more and 80 volume % or less of cubic boron nitride particles, and a binder; wherein the binder contains at least one selected from the group consisting of nitrides, carbides, borides, and oxides of elements in the group 4a, elements in the group 5a, and elements in the group 6a in the periodic table, and solid solutions thereof, at least one selected from the group consisting of simple substances of Zr, Si, Hf, Ge, W and Co, compounds thereof, and solid solutions thereof, and a compound of Al; and when the composite sintered body contains therein W and/or Co, the total weight of the W and/or Co is less than 2.0 weight % and further the composite sintered body contains therein one or more of the Zr, Si, Hf and Ge (hereinafter referred to as "X"), and when the composite sintered body contains the X, the amount of each of the X is 0.005 weight % or more and less than 2.0 weight %, X/(X+W+Co) is 0.01 or more and 1.0 or less and further the weight of Al is 2.0 weight % or more and 20.0 weight % or less.

6 Claims, No Drawings

COMPOSITE SINTERED BODY

RELATED APPLICATIONS

This application is the U.S. National Phase under 35 U.S.C. §371 of International Application No. PCT/JP2008/050884, filed on Jan. 23, 2008, which in turn claims the benefit of Japanese Application No. 2007-020186, filed on Jan. 30, 2007, the disclosures of which Applications are incorporated by reference herein.

TECHNICAL FIELD

The present invention relates to a sintered body of cubic boron nitride, which may be referred to as "cBN" hereinafter, composed of cBN and a ceramic binder. The invention provides a cubic boron nitride sintered body excellent in strength, toughness and wear resistance by restraining the contents and the contents by percentage of Zr, Si, Hf, Ge, W and/or Co contained in the ceramic binder.

BACKGROUND ART

Hitherto, high-hardness sintered bodies using cubic boron nitride have been known. For example, Japanese Patent Laying-Open No. 53-077811 (Patent Document 1) discloses a cBN sintered body containing 20 to 80 volume % of cBN and containing, as the balance, a Ti ceramic binder. However, the sintered bodies do not give a satisfactory tool life span against high-efficiency cuttings, such as interrupted cutting, and heavy-cutting/high-speed cutting. Thus, in order to improve the toughness or the heat resistance of the sintered bodies, the binder is improved, the cBN particles are covered with a ceramic material to strengthen the binding force and improve the dispersibility, and others are attained.

Sintered bodies high in toughness wherein the Ti ceramic binder in Japanese Patent Laying-Open No. 53-077811 (Patent Document 1) is improved are disclosed in Japanese Patent Publication No. 60-014826 (Japanese Patent Laying-Open No. 56-069350 (Patent Document 2)), Japanese Patent Publication No. 61-054857 (Japanese Patent Laying-Open No. 61-179847 (Patent Document 3)), Japanese Patent Publication No. 61-054858 (Japanese Patent Laying-Open No. 61-179848 (Patent Document 4)), and Japanese Patent Laying-Open No. 05-287433 (Patent Document 5), and others. The sintered bodies disclosed in these documents 2 to 5 are high in toughness, and are suitable for interrupted cutting of hardened steel or the like.

Moreover, Japanese Patent Laying-Open No. 10-182242 (Patent Document 6) discloses a sintered body wherein the peripheries of cBN particles are coated with a binder to hold the cBN particles by the binder, whereby the cBN particles are not bonded directly to each other.

U.S. Pat. No. 5,639,285 (Patent Document 7) discloses a sintered body wherein a Ti ceramic binder is improved to strength the binding force between cBN particles and binder particles, thereby bonding the cBN particles mutually to each other.

Furthermore, Japanese Patent Laying-Open No. 07-252580 (Patent Document 8) and Japanese Patent Laying-Open No. 07-252581 (Patent Document 9) each disclose a sintered body wherein Si is incorporated into a binder.

As described above, sintered bodies usable in interrupted cutting of high-hardness hardened steel are supplied by improving the toughness of cBN sintered bodies by the following: an improvement in a binder itself or an improvement in the sintered body microstructure by avoidance of contact between cBN particles or reversely by positive bonding of cBN particles to each other, or some other matter.

Patent Document 1: Japanese Patent Laying-Open No. 53-077811
Patent Document 2: Japanese Patent Publication No. 60-014826 (Japanese Patent Laying-Open No. 56-069350)
Patent Document 3: Japanese Patent Publication No. 61-054857 (Japanese Patent Laying-Open No. 61-179847)
Patent Document 4: Japanese Patent Publication No. 61-054858 (Japanese Patent Laying-Open No. 61-179848)
Patent Document 5: Japanese Patent Laying-Open No. 05-287433
Patent Document 6: Japanese Patent Laying-Open No. 10-182242
Patent Document 7: U.S. Pat. No. 5,639,285
Patent Document 8: Japanese Patent Laying-Open No. 07-252580
Patent Document 9: Japanese Patent Laying-Open No. 07-252581

DISCLOSURE OF THE INVENTION

Problems to be Solved by the Invention

However, the above-mentioned improved examples have problems described below. When a high-hardness material such as hardened steel is cut, the temperature of the cutting edge becomes 600° C. or higher. In recent years, an improvement in productivity has been desired; thus, with an increase in cutting speed or feed per revolution or tooth, cases where the cutting edge temperature rises to about 1000° C. are not rare. Additionally, requests that complicated-shape parts should be cut are rising.

In high-efficiency cutting of such interrupted regions, the withdrawal of a cutting edge and bite thereof are repeated. When the cutting edge is withdrawn, the edge is rapidly cooled. Thus, the edge is subjected to rapid temperature change and stress change.

In the above-mentioned improvements, insufficient are the strength, the toughness and the wear resistance of the binder in high-speed working or high-efficiency interrupted cutting of high-hardness steel, which have been required in recent years. It cannot be therefore said that satisfactory tool life spans are obtained.

The present invention has been made to solve the above-mentioned problems, and an object thereof is to provide a cubic boron nitride sintered body that is excellent in strength, toughness and wear resistance, and realizes a high efficiency and a long life span in mechanical working for high hardness.

Means for Solving the Problems

The composite sintered body of the present invention is a composite sintered body, containing 20 volume % or more and 80 volume % or less of cubic boron nitride particles, and a binder; wherein the binder contains at least one selected from the group consisting of nitrides, carbides, borides, and oxides of elements in the group 4a, elements in the group 5a, and elements in the group 6a in the periodic table, and solid solutions thereof, at least one selected from the group consisting of simple substances of Zr, Si, Hf, Ge, W and Co, compounds thereof, and solid solutions thereof, and a compound of Al; and when the composite sintered body contains therein W and/or Co, the total weight of the W and/or Co is less than 2.0 weight % and further the composite sintered body contains therein one or more of the Zr, Si, Hf and Ge (hereinafter referred to as "X"), and when the composite sintered body contains the X, the amount of each of the X is 0.005 weight % or more and less than 2.0 weight %, X/(X+W+Co) is 0.01 or more and 1.0 or less, and further the weight of Al is 2.0 weight % or more and 20.0 weight % or less.

In the composite sintered body, it is preferred that the binder contains therein Si or Zr, the total weight of the W and/or Co contained in the composite sintered body is less than 1 weight %, the amount of the Si or Zr is 0.01 weight % or more and less than 0.5 weight %, and further Si/(Si+W+Co) or Zr/(Zr+W+Co) is 0.05 or more and 1.0 or less.

It is also preferred that the composite sintered body has a compound of Ti as the binder, the average particle size of the Ti compound is 100 nm or more and 400 nm or less, and the average particle size of the Al compound contained in the binder in the composite sintered body is 50 nm or more and 150 nm or less.

In the composite sintered body, it is also preferred that when the average particle size of the Ti compound contained in the binder is represented by $R_{Ti}$ and the average particle size of the Al compound contained in the binder is represented by $R_{Al}$, $R_{Al}/R_{Ti}$ is 0.2 or more and 0.5 or less.

Effects of the Invention

The composite sintered body of the invention has the above-mentioned structure, thereby making improvements in strength, toughness and wear resistance highly compatible with each other. By the improvements in the properties, the resistance against chipping and the wear resistance are largely improved. As a result, a cutting tool containing, in at least one portion thereof, the composite sintered body of the invention realizes a high efficiency and a long life span, and can be preferably used in high speed cutting, high-efficiency interrupted cutting and heavy interrupted cutting of high-hardness steel.

BEST MODES FOR CARRYING OUT THE INVENTION

The composite sintered body according to the present invention has cBN particles and a ceramic binder. The cBN particles are higher in hardness, strength and toughness than the ceramic binder to act as a skeleton in the sintered body and fulfill a function of holding the material strength making it possible to endure the cutting of high-hardness hardened steel.

In the meantime, the ceramic binder fulfills a function of making it possible to sinter the cBN particles, which are a difficultly-sinterable material, at an industrial-level pressure and temperature, and simultaneously gives an effect of restraining chemical/thermal wear in the cutting of high-hardness hardened steel since the binder is lower in reactivity with iron than cBN.

Accordingly, in high-speed continuous cutting, for which wear resistance is generally required, a cBN sintered body having a relatively low cBN content by percentage is used; in interrupted cutting, for which resistance against chipping is required, a cBN sintered body having a relatively high cBN content by percentage is used.

In other words, in order to improve the wear resistance, it is effective to make the ceramic content by percentage high; however, if the cBN content by percentage relatively becomes too low, the material strength which can endure the cutting of high-hardness hardened steel cannot be held. Thus, a minimum amount of cBN is necessary.

In the meantime, in order to improve the resistance against chipping, it is effective to make the cBN content by percentage high; however, if the content by percentage of the ceramic binder relatively becomes too low, the wear resistance lowers largely. Thus, a minimum amount of the ceramic binder is necessary.

In order to overcome such a tradeoff relationship, the inventors have repeated eager researches, so as to invent a composite sintered body containing 20 volume % or more and 80 volume % or less of cubic boron nitride particles, and a binder; wherein the binder contains at least one selected from the group consisting of nitrides, carbides, borides, and oxides of elements in the group 4a (Ti, Zr, Hf, and so on), elements in the group 5a (V, Nb, Ta, and so on), and elements in the group 6a (Cr, Mo, W, and so on) in the periodic table, and solid solutions thereof; at least one selected from the group consisting of simple substances of Zr, Si, Hf, Ge, W and Co, compounds thereof, and solid solutions thereof, and a compound of Al; and when the composite sintered body contains therein W and/or Co, the total weight of the W and/or Co is less than 2.0 weight % and the composite sintered body contains therein one or more of the Zr, Si, Hf and Ge (hereinafter referred to as "X"), and when the composite sintered body contains the X, the amount of each of the X is 0.005 weight % or more and less than 2.0 weight %, X/(X+W+Co) is 0.01 or more and 1.0 or less and further the weight of Al is 2.0 weight % or more and 20.0 weight % or less.

The inventors have found out that when a binder in a cBN sintered body contains at least one selected from the group consisting of simple substances of Zr, Si, Hf, Ge, W and Co, compounds thereof, and solid solutions thereof, the total weight of the W and Co contained in the sintered body is less than 2.0 weight %, the amount of the X is 0.005 weight % or more and less than 2.0 weight %, and X/(X+W+Co) is 0.01 or more and 1.0 or less and further the total weight of Al is 2.0 weight % or more and 20.0 weight % or less, the material strength and the wear resistance of the ceramic itself used in the binder are largely improved, so that the sintered body exhibits a stable tool life span in a severe cutting environment as described above.

Effects produced by the above-mentioned structure will be described hereinafter.

When high-hardness hardened steel is cut, a cutting edge therefor is exposed to high temperature; thus, its cBN particles, which are high in reactivity with iron, are selectively worn away. As a result, its binder that is naked in a convex form is mechanically abraded so that the binder is broken and dropped off to advance abrasion of the binder.

In interrupted cutting, the binder portions low in material strength are finely cracked by interrupted impacts. When the cracks advance, the binder is selectively broken and dropped off so as to be chipped.

In the invention, a binder contains therein at least one selected from the group consisting of simple substances of Zr, Si, Hf, Ge, W and Co, compounds thereof, and solid solutions thereof, the total weight of the W and Co contained in the sintered body is less than 2.0 weight %, the amount of the X is 0.005 weight % or more and less than 2.0 weight %, and X/(X+W+Co) is 0.01 or more and 1.0 or less, thereby improving the strength, the toughness and the wear resistance of the binder. For this reason, against high-speed working or high-efficiency interrupted cutting of high-hardness steel, the invention has attained a far greater life span extension from life spans of conventional tools.

In other words, a very small amount of at least one selected from the group consisting of simple substances of Zr, Si, Hf, Ge, W and Co, compounds thereof, and solid solutions thereof is dispersed in the binder, thereby giving an effect of making the strength and the toughness of the binder high, so that the breakdown and drop-off of the binder are largely restrained in cutting. If the total weight of the W and Co is at least 2 weight % or the amount of the X is 2.0 weight % or more, the toughness of the sintered body falls. If the amount of the X is less than 0.005 weight %, the effect of making the strength and the toughness high cannot be obtained.

Furthermore, it is presumed that in accordance with the ratio by weight between X, W and Co, the presence forms such as the composition or the particle size of a binder phase in the sintered body are varied so that the strength, the toughness and the heat resistance thereof change. When X, W and Co are present in such a weight ratio that X/(X+W+Co) satisfies 0.01 or more and 1.0 or less, the strength, the toughness and the wear resistance of the sintered body are particularly excellent.

If the total weight of Al contained in the sintered body is less than 2.0 weight %, the strength of the sintered body lowers. If it is more than 20 weight %, the wear resistance lowers.

If the content by percentage of the cBN particles is less than 20 volume %, the strength of the sintered body lowers largely. If it is more than 80 volume %, the wear resistance lowers largely.

The total weight of the W and Co is more preferably less than 1 weight %, even more preferably 0.5 weight %. The lower limit thereof is not particularly limited. In the meantime, the upper limit of the amount of the X is more preferably 1 weight %, even more preferably 0.5 weight %. The lower limit thereof is more preferably 0.01 weight %, even more preferably 0.05 weight %. The lower limit of the X/(X+W+Co) is more preferably 0.05, even more preferably 0.2. The upper limit is 1 in a case where W and Co are not contained at all. The upper limit of the total weight of Al is more preferably 10 weight %, even more preferably 7 weight %, and the lower limit thereof is more preferably 2.5 weight %, even more preferably 3 weight %.

It is preferred that the binder contains therein Si or Zr, the total weight of W and Co contained in the sintered body is less than 1 weight %, the amount of Si or Zr is 0.01 weight % or more and less than 0.5 weight %, and Si/(Si+W+Co) or Zr/(Zr+W+Co) is 0.05 or more and 1.0 or less. If the weight of Si or Zr is less than 0.01 weight %, a compound of Ti or Al grows into abnormal grains when the sintered body material is sintered at high temperature, so that the strength of the sintered body declines. On the other hand, if the weight of Si or Zr is 0.5 weight % or more, a diffusion reaction of the binder is excessively restrained so that between the cBN particles and the binder and between the binder materials, the binding force lowers. Thus, the toughness and the heat resistance of the sintered body decline. In particular, Si contained in a very small amount in the binder in the sintered body restrains an excessive diffusion reaction of the Ti or Al compound constituting the binder when the sintered body material is sintered at superhigh pressure and high temperature. As a result, the Si has a large effect of restraining the growth of the binder into abnormal grains. When the weight thereof is in the above-mentioned range, an effect of making the strength and the toughness of the sintered body particularly high is obtained.

The upper limit of the Si or Zr is more preferably 0.3 weight %, even more preferably 0.15 weight %, and the lower limit thereof is more preferably 0.03 weight %, even more preferably 0.05 weight %. The lower limit of Si/(Si+W+Co) or Zr/(Zr+W+Co) is more preferably 0.065, even more preferably 0.08, and the upper limit thereof is 1 in a case where W and Co are not contained at all.

It is also preferred that the average particle size of the Ti compound contained in the binder is 100 nm or more and 400 nm or less and the average particle size of the Al compound contained in the binder is 50 nm or more and 150 nm or less. If the average particle size of the Ti compound is less than 100 nm or the average particle size of the Al compound is less than 50 nm, the toughness and the heat resistance of the sintered body lower. If the average particle size of the Ti compound is more than 400 nm or the average particle size of the Al compound is more than 150 nm, the strength of the sintered body lowers.

The upper limit of the average particle size of the Ti compound is more preferably 350 nm, even more preferably 300 nm, and the lower limit thereof is more preferably 150 nm, even more preferably 200 nm. The upper limit of the average particle size of the Al compound is more preferably 130 nm, even more preferably 110 nm, and the lower limit thereof is more preferably 70 nm, even more preferably 90 nm.

When the average particle size of the Ti compound contained in the binder is represented by $R_{Ti}$ and the average particle size of the Al compound contained therein is represented by $R_{Al}$, it is preferred that $R_{Al}/R_{Ti}$ is 0.2 or more and 0.5 or less. Such a particle size ratio gives an excellent balance between the strength and the toughness of the sintered body.

EXAMPLES

Examples of the composite sintered body according to the invention will be specifically described by way of the following Examples; however, the invention is not limited thereto.

Example 1

A pot and balls each made of a cemented carbide alloy were used to pulverize compounds obtained by subjecting powders wherein TiN0.6 or Ti(CN)0.6 and Al were mixed at various ratios by weight to thermal treatment at 1200° C. in a vacuum for 30 minutes, so as to yield binder powders.

Next, each of these binders and a cBN powder having an average particle size of 1.2 μm were blended so as to give cBN contents by percentage in Table 1. At the same time, any one of Zr, Si, Hf and Ge fine powders, and W plus Co were added thereto in very small amounts, and mixed into a uniform state, and then the resultants were kept at 900° C. in a vacuum furnace for 20 minutes to remove gases. Furthermore, the powders were each filled into a capsule made of Mo, and then sintered at a pressure of 5.8 GPa and a temperature of 1400° C. in a superhigh pressure machine for 20 minutes.

About the resultant sintered bodies, results obtained by compound-identification based on XRD (X-ray diffractometry) and results obtained by quantitative analysis based on ICP (inductively coupled plasma emission spectrometry) are shown together in Table 1.

TABLE 1

| Classification | Sample No. | cBN content by percentage (volume %) | XRD identified compounds | X (Zr, Si, Hf or Ge) content (weight %) | Total content (weight %) of W and Co | X/(X + W + Co) | Al content (weight %) |
|---|---|---|---|---|---|---|---|
| Example | 1-1 | 45 | cBN, TiN, TiB$_2$, AlB$_2$, AlN | Si: 0.02 | 1.5 | 0.013 | 4 |
| Example | 1-2 | 45 | cBN, TiN, TiB$_2$, AlB$_2$, AlN | Si: 0.12 | 0.8 | 0.130 | 4 |
| Example | 1-3 | 45 | cBN, TiN, TiB$_2$, AlB$_2$, AlN | Zr: 0.23 | 0.7 | 0.247 | 4 |
| Example | 1-4 | 45 | cBN, TiN, TiB$_2$, AlB$_2$, AlN | Hf: 0.36 | 1.53 | 0.190 | 4 |

TABLE 1-continued

| Classification | Sample No. | cBN content by percentage (volume %) | XRD identified compounds | X (Zr, Si, Hf or Ge) content (weight %) | Total content (weight %) of W and Co | X/(X + W + Co) | Al content (weight %) |
|---|---|---|---|---|---|---|---|
| Example | 1-5 | 45 | cBN, TiN, TiB$_2$, AlB$_2$, AlN | Ge: 0.42 | 1.62 | 0.206 | 4 |
| Example | 1-6 | 45 | cBN, TiN, TiB$_2$, AlB$_2$, AlN | Si: 0.56 | 0.65 | 0.463 | 5.5 |
| Example | 1-7 | 50 | cBN, TiN, TiB$_2$, AlB$_2$, AlN | Si: 0.07 | 1.24 | 0.053 | 6 |
| Example | 1-8 | 55 | cBN, TiCN, TiB$_2$, AlB$_2$, AlN | Si: 0.08 | 1.2 | 0.063 | 6 |
| Example | 1-9 | 70 | cBN, TiN, TiB$_2$, AlB$_2$, AlN | Si: 0.10 | 1.43 | 0.065 | 8 |
| Comparative Example | 1-10 | 85 | cBN, TiN, TiB$_2$, AlB$_2$, AlN | Si: 0.06 | 0.8 | 0.070 | 15 |
| Comparative Example | 1-11 | 40 | cBN, TiN, TiB$_2$, AlB$_2$, AlN | — | 3.4 | 0 | 5 |
| Comparative Example | 1-12 | 45 | cBN, TiN, TiB$_2$, AlB$_2$, AlN | — | 4.5 | 0 | 5 |
| Comparative Example | 1-13 | 50 | cBN, TiN, TiB$_2$, AlB$_2$, AlN | Si: 0.03 | 5.1 | 0.006 | 5.5 |
| Comparative Example | 1-14 | 45 | cBN, TiN, TiB$_2$, AlB$_2$, AlN | Si: 0.56 | 0.65 | 0.463 | 25 |

Furthermore, the resultant sintered bodies were used to produce cBN tools (ISO model number: CNGA120408). In Table 2 are shown results obtained by examining the wear amounts thereof and the tool life spans thereof up to chipping in hardened steel high-speed continuous cutting under conditions described below.

Material to be cut: Carburized hardened steel SCM415H, HRC62
Round bar 100 mm in diameter and 300 mm in length
Cutting conditions: Cutting velocity V=300 m/min., feed f=0.1 mm/rev., and cutting depth d=0.1 mm in a dry state

TABLE 2

| Classification | Sample No. | Flank wear amount (mm) when cutting of 5 km was completed | Cutting length (km) up to chipping |
|---|---|---|---|
| Example | 1-1 | 0.057 | 11.6 |
| Example | 1-2 | 0.053 | 13.0 |
| Example | 1-3 | 0.054 | 12.7 |
| Example | 1-4 | 0.06 | 11.3 |
| Example | 1-5 | 0.061 | 11.1 |
| Example | 1-6 | 0.056 | 12.4 |
| Example | 1-7 | 0.056 | 12.3 |
| Example | 1-8 | 0.057 | 12.5 |
| Example | 1-9 | 0.065 | 11.5 |
| Comparative Example | 1-10 | 0.085 | 6.6 |
| Comparative Example | 1-11 | 0.079 | 7.1 |
| Comparative Example | 1-12 | 0.076 | 7.4 |
| Comparative Example | 1-13 | 0.074 | 7.8 |
| Comparative Example | 1-14 | 0.077 | 7.3 |

It is understood that in sample Nos. 1-1 to 1-9 satisfying the requirements of the invention, the flank wear amount is smaller and the life span up to chipping is also longer than in sample Nos. 1-10 to 1-14 of Comparative Examples. It is also understood that in sample No. 1-2, wherein the total weight of W and Co is less than 1 weight %, the weight of Si is 0.01 weight % or more and less than 0.5 weight %, and Si/(Si+W+Co) is 0.05 or more and 1.0 or less, and sample No. 1-3, wherein the weight of Zr is 0.01 weight % or more and less than 0.5 weight %, and Zr/(Zr+W+Co) is 0.05 or more and 1.0 or less, in particular, the flank wear amount is small and the life span up to chipping is also long.

Example 2

A pot and balls each made of a cemented carbide alloy were used to pulverize compounds obtained by subjecting powders wherein TiN0.6 and Al were mixed at various ratios by weight to thermal treatment at 1200° C. in a vacuum for 30 minutes, so as to yield binder powders.

Next, each of these binders and a cBN powder having an average particle size of 3.5 μm were blended so as to give cBN contents by percentage in Table 3. A Zr or Si fine powder, and W plus Co were added to the blend powders in very small amounts, and mixed into a uniform state, and then the resultants were kept at 900° C. in a vacuum furnace for 20 minutes to remove gases. Furthermore, the powders were each filled into a capsule made of Mo, and then sintered under sintering conditions shown in Table 3 in a superhigh pressure machine for 20 minutes.

About the resultant sintered bodies, in Table 3 are together shown results obtained by compound-identification based on XRD, results obtained by quantitative analysis based on ICP, and results obtained by examining the average particle size of the Ti compound and that of the Al compound by observation with an SEM (electronic microscope). The average particle size of the Ti compound and that of the Al compound can be controlled by the average particle size of the binder, which is a starting material, and sintering conditions.

TABLE 3

| Classification | Sample No. | cBN content by percentage (volume %) | Sintering conditions | XRD identified compounds | X (Zr or Si) content (weight %) | Total content (weight %) of W and Co | X/(X + W + Co) | Al content (weight %) | Average particle size (nm) of Ti compound | Average particle size (nm) of Al compound |
|---|---|---|---|---|---|---|---|---|---|---|
| Example | 2-1 | 65 | 6.5 GPa, 1500° C. | cBN, TiN, TiB$_2$, AlB$_2$, AlN | Si: 0.11 | 0.72 | 0.13 | 6 | 246 | 78 |
| Example | 2-2 | 70 | 6.5 GPa, 1500° C. | cBN, TiN, TiB$_2$, AlB$_2$, AlN | Si: 0.07 | 0.65 | 0.10 | 5 | 235 | 72 |

TABLE 3-continued

| Classification | Sample No. | cBN content by percentage (volume %) | Sintering conditions | XRD identified compounds | X (Zr or Si) content (weight %) | Total content (weight %) of W and Co | X/(X + W + Co) | Al content (weight %) | Average particle size (nm) of Ti compound | Average particle size (nm) of Al compound |
|---|---|---|---|---|---|---|---|---|---|---|
| Example | 2-3 | 70 | 5.5 GPa, 1250° C. | cBN, TiN, TiB$_2$, AlB$_2$, AlN | Zr: 0.6 | 0.7 | 0.46 | 5 | 123 | 21 |
| Example | 2-4 | 70 | 6.5 GPa, 1650° C. | cBN, TiN, TiB$_2$, AlB$_2$, AlN | Si: 0.07 | 0.83 | 0.08 | 5 | 312 | 120 |
| Example | 2-5 | 70 | 6.5 GPa, 1800° C. | cBN, TiN, TiB$_2$, AlB$_2$, AlN | Si: 0.07 | 0.76 | 0.08 | 5 | 576 | 265 |
| Example | 2-6 | 75 | 6.5 GPa, 1500° C. | cBN, TiN, TiB$_2$, AlB$_2$, AlN | Si: 0.05 | 0.6 | 0.08 | 4 | 241 | 74 |
| Comparative Example | 2-7 | 70 | 6.5 GPa, 1500° C. | cBN, TiN, TiB$_2$, AlB$_2$, AlN, CoW$_2$B$_2$, WC, W | — | 4.1 | 0 | 5 | 419 | 185 |
| Comparative Example | 2-8 | 70 | 6.5 GPa, 1650° C. | cBN, TiN, TiB$_2$, AlB$_2$, AlN, CoW$_2$B$_2$, WC, W | — | 4.1 | 0 | 5 | 673 | 381 |
| Comparative Example | 2-9 | 85 | 6.5 GPa, 1500° C. | cBN, TiN, TiB$_2$, AlB$_2$, AlN | Si: 0.07 | 0.69 | 0.09 | 20 | 224 | 68 |
| Comparative Example | 2-10 | 70 | 6.5 GPa, 1500° C. | cBN, TiN, TiB$_2$, AlB$_2$, AlN | Si: 0.07 | 0.65 | 0.10 | 1.5 | 243 | 65 |

Furthermore, the resultant sintered bodies were used to produce cBN tools (ISO model number: CNGA120408). In Table 4 are shown results obtained by examining the tool life spans thereof up to chipping in hardened steel high-efficiency interrupted cutting under conditions described below.

Material to be cut: Carburized hardened steel SCM415H, HRC62
  100 mm in diameter and 300 mm in length having six V-shaped grooves in the axial direction of the material to be cut Cutting conditions: Cutting velocity V=200 m/min., feed f=0.15 mm/rev., and cutting depth d=0.3 mm in a dry state

TABLE 4

| Classification | Sample No. | Cutting length (km) up to chipping |
|---|---|---|
| Example | 2-1 | 1.3 |
| Example | 2-2 | 1.45 |
| Example | 2-3 | 1.12 |
| Example | 2-4 | 1.53 |
| Example | 2-5 | 1.15 |
| Example | 2-6 | 1.58 |
| Comparative Example | 2-7 | 0.54 |
| Comparative Example | 2-8 | 0.41 |
| Comparative Example | 2-9 | 0.48 |
| Comparative Example | 2-10 | 0.23 |

It is understood that in sample Nos. 2-1 to 2-6, wherein the sintered body contains Si or Zr in an amount of 0.005 weight % or more and 2 weight % or less, the life span up to chipping is remarkably longer than in Comparative Example Nos. 2-7 and 8, which do not contain Si or Zr.

It is understood that in Comparative Example No. 2-9, wherein the cBN content by percentage is more than 80 volume %, and Comparative Example No. 2-10, wherein the sintered body contains Al in an amount less than 2 weight %, the life spans thereof are shorter than in Example Nos. 2-1 to 2-6. It is also understood that the sample Nos. 2-1, 2, 4 and 6, wherein the average particle size of the Ti compound is 100 nm or more and 400 nm or less and further the average particle size of the Al compound contained in the binder is 50 nm or more and 150 nm or less, have a particularly long life span.

Example 3

A pot having an inner wall made of Si$_3$N$_4$ and balls made of Si$_3$N$_4$ were used to pulverize a compound obtained by subjecting a powder wherein TiN0.6 and Al were mixed at a ratio by weight of 80:20 to thermal treatment at 1200° C. in a vacuum for 30 minutes, so as to yield binder powders. Next, each of these binders and a cBN powder having an average particle size of 1.0 μm were blended so as to give a cBN content by percentage of 60 volume %. A pot having an inner wall made of TEFLON (registered trademark) and balls made of Si$_3$N$_4$ were used to mix each of the blend powders into a uniform state. At the same time, at least one of Si, W and Co was added thereto in a very small amount, and each of the resultants were mixed into a uniform state. Thereafter, the resultants were kept at 900° C. in a vacuum furnace for 20 minutes to remove gases. Furthermore, the powders were each filled into a capsule made of Mo, and then sintered under sintering conditions shown in Table 5 in a superhigh pressure machine for 20 minutes.

About the resultant sintered bodies, in Table 5 are together shown results obtained by analyzing Si, W and Co quantitatively by ICP and measuring the average particle size of the Ti compound and that of the Al compound by observation with an SEM (electron microscope).

TABLE 5

| Classification | Sample No. | Sintering conditions | Contents (weight %) of Si, W and Co | Si/(Si + W + Co) | Average particle size $R_{Ti}$ (nm) of Ti compound | Average particle size $R_{Al}$ (nm) of Al compound | $R_{Al}/R_{Ti}$ |
|---|---|---|---|---|---|---|---|
| Example | 3-1 | 5.5 GPa, 1350° C. | Si: 0.4, W: 0.6, Co: 0.25 | 0.32 | 112 | 61 | 0.54 |
| Example | 3-2 | 5.5 GPa, 1500° C. | Si: 0.4, W: 0.6, Co: 0.25 | 0.32 | 152 | 72 | 0.47 |
| Example | 3-3 | 5.5 GPa, 1600° C. | Si: 0.4, W: 0.6, Co: 0.25 | 0.32 | 201 | 74 | 0.37 |
| Example | 3-4 | 5.5 GPa, 1700° C. | Si: 0.4, W: 0.6, Co: 0.25 | 0.32 | 398 | 76 | 0.19 |
| Example | 3-5 | 6.0 GPa, 1500° C. | Si: 0.4, W: 0.6, Co: 0.25 | 0.32 | 243 | 87 | 0.36 |
| Example | 3-6 | 6.5 GPa, 1500° C. | Si: 0.4, W: 0.6, Co: 0.25 | 0.32 | 250 | 107 | 0.43 |
| Example | 3-7 | 6.5 GPa, 1700° C. | Si: 0.4, W: 0.6, Co: 0.25 | 0.32 | 379 | 125 | 0.33 |
| Example | 3-8 | 6.5 GPa, 1500° C. | Si: 0.4, W: 0.6, Co: 0 | 0.4 | 243 | 81 | 0.33 |
| Example | 3-9 | 6.5 GPa, 1500° C. | Si: 0.4, W: 0, Co: 0 | 1 | 239 | 76 | 0.32 |

The resultant sintered bodies were used to produce cBN tools (ISO model number: CNGA120408). In Table 6 are shown results obtained by examining the tool life spans thereof up to chipping in dice steel interrupted cutting under conditions described below.

Material to be cut: Dice steel SKD11, HRC63
100 mm in diameter and 300 mm in length having six V-shaped grooves in the axial direction of the material to be cut
Cutting conditions: Cutting velocity V=120 m/min., feed f=0.1 mm/rev., and cutting depth d=0.2 mm in a dry state

TABLE 6

| Classification | Sample No. | Cutting length (km) up to chipping |
|---|---|---|
| Example | 3-1 | 1.1 |
| Example | 3-2 | 1.33 |
| Example | 3-3 | 1.41 |
| Example | 3-4 | 0.95 |
| Example | 3-5 | 1.44 |
| Example | 3-6 | 1.46 |
| Example | 3-7 | 1.25 |
| Example | 3-8 | 1.49 |
| Example | 3-9 | 1.52 |

It is understood that sample Nos. 3-2, 3, 5, 6, 7, 8 and 9, wherein when the average particle size of the Ti compound contained in the binder is represented by $R_{Ti}$ and the average particle size of the Al compound contained therein is represented by $R_{Al}$, $R_{Al}/R_{Ti}$ is 0.2 or more and 0.5 or less, have a longer life span up to chipping than in sample Nos. 3-1 and 4.

Although the embodiments and examples of the present invention have been described above, it is originally intended that the individual embodiments and examples are appropriately combined.

It should be understood that the embodiments and examples disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A composite sintered body, comprising:
20 volume % or more and 80 volume % or less of cubic boron nitride particles; and
a binder, wherein:
said binder comprises at least one selected from the group consisting of nitrides, carbides, borides, and oxides of Ti and elements in the groups 5a and 6a in the periodic table, and solid solutions thereof, at least one selected from the group consisting of Zr, Si, Hf, Ge, W and Co, compounds thereof, and solid solutions thereof, and a compound of Al;
when said composite sintered body contains therein W and/or Co, the total weight of the W and/or Co is less than 2.0 weight %;
said composite sintered body contains therein one or more of said Zr, Si, Hf and Ge (hereinafter referred to as "X"), and the amount of each of the X is 0.005 weight % or more and less than 2.0 weight % and X/(X+W+Co) is 0.01 or more and 1.0 or less;
the weight of Al in said compound of Al is 2.0 weight % or more and 20.0 weight % or less; and
said compound of Al is $AlB_2$ and/or AlN.

2. The composite sintered body according to claim 1, wherein said binder contains therein Si or Zr, the total weight of said W and/or Co contained in the composite sintered body is less than 1 weight %, the amount of said Si or Zr is 0.01 weight % or more and less than 0.5 weight %, and further Si/(Si+W+Co) or Zr/(Zr+W+Co) is 0.05 or more and 1.0 or less.

3. The composite sintered body according to claim 2, having a Ti compound as said binder, the average particle size of the Ti compound being 100 nm or more and 400 nm or less, and the average particle size of the Al compound contained in said binder in said composite sintered body being 50 nm or more and 150 nm or less.

4. The composite sintered body according to claim 3, wherein when the average particle size of the Ti compound contained in said binder is represented by $R_{Ti}$ and the average particle size of the Al compound contained in said binder is represented by $R_{Al}$, $R_{Al}/R_{Ti}$ is 0.2 or more and 0.5 or less.

5. The composite sintered body according to claim 1, having a Ti compound as said binder, the average particle size of the Ti compound being 100 nm or more and 400 nm or less, and further the average particle size of the Al compound contained in said binder in said composite sintered body being 50 nm or more and 150 nm or less.

6. The composite sintered body according to claim 5, wherein when the average particle size of the Ti compound contained in said binder is represented by $R_{Ti}$ and the average particle size of the Al compound contained in said binder is represented by $R_{Al}$, $R_{Al}/R_{Ti}$ is 0.2 or more and 0.5 or less.

* * * * *